Patented Apr. 17, 1951

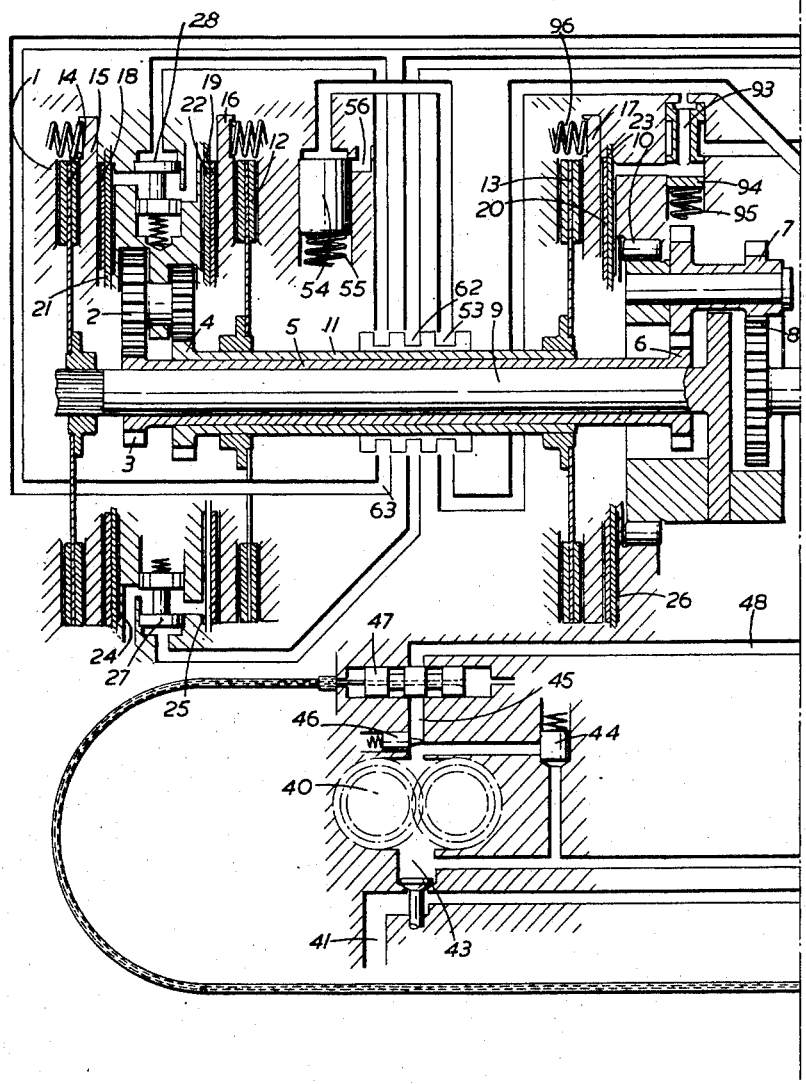

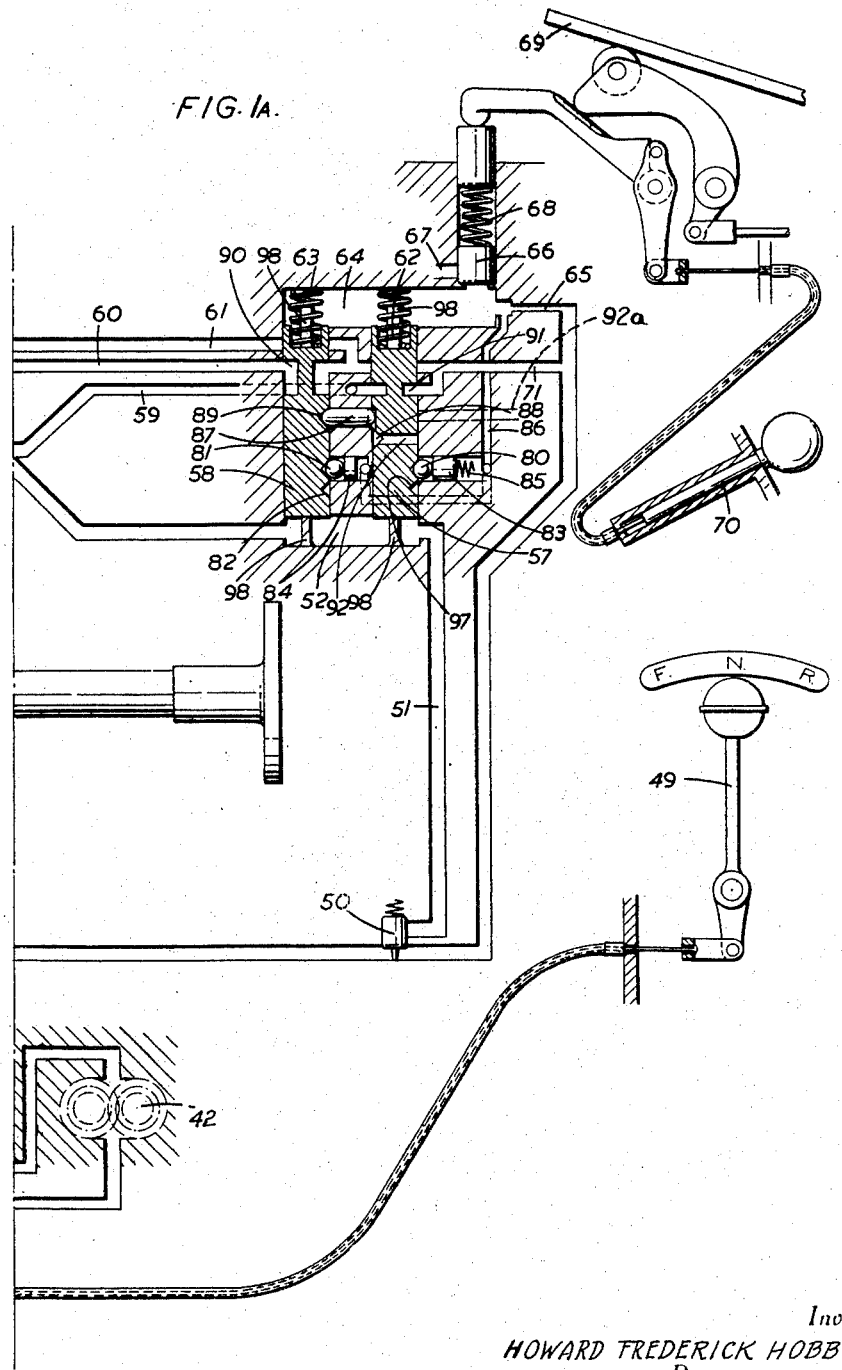

2,549,090

UNITED STATES PATENT OFFICE 2,549,090

VARIABLE RATIO POWER TRANSMISSION APPARATUS

Howard Frederick Hobbs, Leamington Spa, England, assignor to Hobbs Transmission Limited, Leamington Spa, England, a British company Application February 17, 1948, Serial No. 8,856
In Great Britain February 19, 1947

20 Claims. (Cl. 74—752)

This invention relates to variable ratio power transmission apparatus and its main object is to provide an improved and simple means for controlling changes of ratio in which automatic ratio changing is combined with a desirable degree of manual control.

The main purpose of the invention is to control ratio changing of a transmission of the kind comprising gearing and a number of hydraulically actuated friction devices. Additional positively engaging devices may also be controlled by the same means.

The invention is applicable to that particular kind of transmission in which there is at least one friction device used for operatively engaging the input with the transmission, i. e., for starting and stopping.

According to the invention an automatic control device for variable speed transmission gearing having a series of hydraulically actuated friction devices, comprises, a valve device carried by a rotary input part having an exhaust, port or ports, and a delivery duct from an input driven pump, centrifugal force on the said valve controlling the liquid pressure delivered by the pump and engaging load on at least one of said friction devices for the purpose of automatic engagement for starting and stopping, at least one distributor valve having different positions so as to direct pressure to one or another to a different series of said friction devices, said distributor valve or valves automatically, by means of the variable liquid pressure, controlled by said piston.

The valve device may be arranged so that the pressure from the pump will act on the outer end of a piston thereby tending to move it inwards and uncover the exhaust port. A spring may act on the inner end of the piston valve to assist the centrifugal force thereon. The distributor valve may comprise a piston within a cylinder having two operative positions only at the ends of its travel and it may be located by ball detents locating in holes or grooves in the piston. The detents may be spring urged or they may be urged by means of a piston on which liquid pressure acts. The detents may be urged into engagement by both liquid pressure and springs. Two or more similarly constructed distributor valves may be employed each positioned in two positions by detents, and the pistons may be interlocked by means of balls or rods which mate with holes or grooves so that one piston cannot move until the other has already moved. The distributor valves may be urged in one direction by springs and in the other direction by liquid pressure. Liquid pressure may also be utilized to assist the springs, and the amount of this liquid pressure may be controlled by the operator and by means of a valve and spring.

The operator's control may comprise a valve connected to the throttle control of the engine associated with the transmission whereby at small throttle openings the distributor valve will move from one position to another at different speeds than at larger throttle openings. A hand control may be provided to operate a valve whereby the pressure in the system will be shut off so as to give a neutral condition. The control will be preferably associated with the type of transmission having at least two input rotary friction devices, and these will be provided with exhaust valves whereby when the pressure is shut by the distributor valve the exhaust valves will open thereby emptying the liquid actuating spaces of the rotary clutches.

Push off springs will be provided to assist disengagement of the clutches and the clutches may be designed so that centrifugal action on the liquid within the rotary actuating spaces will, due to centrifugal head, provide a substantial part of the engaging load.

An output driven pump may be included in the control device for the purpose of providing pressure to engage one or more of said friction devices when the engine and input driven pump is stationary. A relief valve will be provided so as to prevent pressure in the system rising beyond some given predetermined amount. A further valve may be provided which maintains some given minimum pressure in certain parts of the hydraulic circuit.

One constructional form of the invention will now be described by way of example with reference to the accompanying drawings in which:

Figures 1 and 1A are the left and right hand parts respectively of a diagrammatic drawing showing one arrangement of a control device constructed in accordance with the invention.

The shaded portion 1 represents a rotary input part of the transmission apparatus and for the purpose of description this is shown to carry spindles of double planet pinions 2, one set of which mesh with the gun-gear 3 and the other set with the sun-gear 4. The sun-gear 3 is mounted on an intermediate shaft 5 which carries the sun-gear 6 of a second planetary gear train. This also has double planet pinions 7 one set of which mesh with the sun-gear 6 and the other set with the sun-gear 8 carried by the output shaft. The cage of the rear planetary train is formed on the intermediate shaft 9 and this cage also co-acts with a roller detent mechanism 10 whereby the cage is prevented from rotating in a reverse direction. A reaction shaft 11 carries the sun-gear 4 and also the spinner plates of the clutch 12 and the reaction brake 13. The intermediate shaft 9 carries the spinner plate of the clutch 14. The gearing arrangement shown is merely by way of example and to illustrate the operation of the automatic control device which may be applied to any combination of gearing and friction devices, which may or may not include roller or toothed detents and dog-clutches.

To simplify description no means for obtaining reverse is shown.

The friction devices comprise spinner plates, pressure plates 15, 16, 17, insulator plates 18, 19, 20, and diaphragms 21, 22, 23. The devices are engaged by opening fluid pressure to the spaces 24, 25, 26. The clutches 12, 14, are each provided with an exhausting valve shown at 27, 28. Engagement of brake 13 provides 1st gear and engagement of clutch 12 provides 2nd gear, and engagement of clutches 12 and 14 together provide 3rd gear or direct gear.

The control device is constructed as follows:

An input driven pump 40 draws liquid from the suction 41 which leads to the sump. An output driven pump 42 normally merely serves to pass oil from the suction 41 to the suction space 43, but should the input pump 40 be stationary rotation of the pump 42, such as by towing a vehicle to which the apparatus is fitted, will cause valve 44 to lift and the pump 42 will supply oil to the outlet duct 45. A relief valve 46 prevents excessive pressure in the duct 45. The manually controlled valve 47, operated from the lever 49, serves to shut off pressure to the duct 48 so as to provide a positive neutral condition. A valve 50 maintains some given minimum pressure in duct 48 and liquid passing the valve 50 enters the duct 51 which leads to a pressure space 52 and through a feed 53 to a piston valve 54 which operates in a bore formed in the rotary input part 1. The piston valve 54 is urged outwards by the spring 55, and also by centrifugal force acting upon the valve. Pressure acting in the space 52 reaches the piston valve 54 and tends to move the valve inwards thereby uncovering the exhaust 56. A variable pressure is therefore maintained in the space 52 which will depend upon the speed of the rotary input part, the mass and area of the piston valve 54, and the strength of the spring 55. Since if the pressure rises above some predetermined given pressure for any given speed the exhaust 56 will be opened. The distributor valves 57, 58, serve to open and close the ducts 59, 60 and 61 which lead to the friction devices. The distributor valves are urged downwards by the springs 62, 63, and these are assisted by pressure in the space 64. Liquid enters the space by duct 65 which is of restricted area and is controlled by the valve 66 which is urged outwards by the pressure to uncover the exhaust 67, and inwards by the spring 68. A given pressure will be maintained in space 64 dependent upon the force exerted by the spring 68. The force from the spring will be varied by movement of the throttle control pedal 69, and can be set at some minimum value by the hand lever 70. With throttle opening at a minimum the force on the spring 68 will be a minimum. Increase in throttle opening will increase the force on spring 68 and movement of the pedal beyond the position giving full throttle may still further increase the force from the spring. Pressure in space 64 will therefore vary according either to the position of the accelerator pedal or the lever 70. The duct 71 leads to the distributor valves and can be opened or closed to either of the ducts 59, 60, 61. After pressure is open, for example to duct 60, it will pass through the feed 62 and act on the valve 27 causing the valve to move inwards against its spring and so open the pressure to the space 25. Similarly pressure opened to the duct 61 will pass through the feed 63 to the space 24. With removal of pressure from the valves 27, 28, the spaces are exhausted since the valves will move to the position shown and open the spaces to exhaust ports. The distributor valves 57, 58, are located in two positions by detents 80, 81, which operate in grooves such as 82. The detents are pressed into engagement by pistons 83, 84, and may also have springs such as 85. The pistons are opened to the pressure in the space 64 by means of the duct 86. The interlocking rod 87 interlocks the distributor valves so that until the distributor valve 57 moves outwards, allowing the rod 87 to enter groove 88, the valve 58 is prevented from moving outwards. Similarly when both are in the outwards position the valve 57 cannot move inwards until the valve 58 has already moved inwards allowing the rod 87 to enter groove 89. The grooves 90 and 91 serve to connect the duct 71 with the ducts 59, 60, 61. The hole 92 serves to exhaust duct 59 when valve 57 is in its outwards position.

The shaded rotary part 1 extends as shown around and carries the parts 14, 15, 18, 22, 16, 12, 54, 56, 24, 27, 25, and is driven by any usual input shaft.

The shaded parts around the parts 13, 20, 17, 26, 23, 94, 93, 58, 57, 66, 40, 47, 44, 42, are all fixed parts attached to the usual gear housing.

In operation the variable pressure in the space 52 acts on the ends of the valves 57, 58, and tends to push them outwards against the resistance of the detents 80, 81. The springs 62, 63 tend to push the valves inwards as does also the pressure in space 64 which acts on the outer ends of the valves. The pressure in space 52 will increase with speed and the pressure in the space 64 will be varied according to the position of the pedal 69 or the lever 70. At some predetermined low input speed both of the valves will be inwards since the pressure in the space 52 will be low. In this case the pressure in the space will pass the duct 93 in the valve 94 to the space 26. The valve 94 is urged in the one direction by the spring 95 and in the other by the pressure in the space 52. At low speeds a low pressure will act in the space 26, but on increase of speed the pressure will first increase gradually (as the pressure in the space 52 is increased because of the increased centrifugal force on the valve 54). When some predetermined pressure is reached however the valve 94 will move inwards thus opening the duct 59 to the space 26, the duct 59 being then open to the increased pressure in the ducts 48, 71. This provides an automatic engaging effect, the push off springs 96 being sufficiently strong to overcome the pressure in the space 26 at idling speeds, the pressure first gradually increasing with increased R. P. M. and then more rapidly, causing smooth engagement of the devices 13. As speed of the member 1 is further increased the pressure in the space 52 is increased until the pressure acting on the end of the valve 57 is sufficient to overcome the force from the spring 62, pressure in the space 64 and the resistance from the detent 80. The valve 57 snaps outwards and is located by the detent in the groove 97. Pegs 98 ensure that the valves do not move beyond positions located by the detents. With the valve 57 in the outwards position the duct 59 and space 26 are exhausted through a port 92a and the pressure is led to the ducts 60 and the space 25 which causes engagement of the clutch 12 and the transmission operates in 2nd gear ratio. This causes the speed of the input part 1 to be reduced but the valve 57 does not thereupon move inwards since the spring 62 and the pressure in the space 64 must overcome both the pressure in the space 52 and the resistance of the detent 80 before the valve will move inwards. As the speed of the input part 1 again increases the pressure in the space 52 will again increase until it is sufficient to cause the valve 58 to move outwards whereupon both clutches 12, 14, are engaged and the apparatus operates in direct ratio. If the speed of the member 1 and the pressure in the space 52 is sufficiently reduced the spring 62 and the pressure in the space 64 will overcome the pressure in the space 52 and the resistance of the detent 81 and the valve 58 will snap inwards, clutch 14 thereupon being disengaged and exhausted by means of the valve 28. The transmission operates in 2nd ratio. This will allow the speed of the part 1 to increase but the valve 58 will not thereupon move outwards since the difference in speed and pressure in the space 52, to cause the inwards and outwards movements, will be greater than the difference in speed due to the change in ratio. When operating in 2nd ratio the valve 57 can be moved inwards with decreased speed in the same manner as already described, whereupon the transmission will operate in 1st ratio. The speeds at which the changes are made will be largely dependent upon the pressure in the space 64 and acting on the pistons 83, 84, and hence will be dependent upon the position of the accelerator pedal, or the lever 70. The main purpose of the lever 70 is for use when descending hills in a vehicle fitted with the device when the valves 57, 58 can be made to move inwards at a relatively high speed of the part 1 and valve 54, when the throttle of the engine is closed. The lever 70 can be pulled outwards thus putting the maximum force from the spring 68 on the valve 66 and thereby the maximum pressure in the space 64. Since the arrangement of the distributor valves and the piston valve 54 comprises an important part of the invention the action should be clearly understood. The valve 54 may provide a pressure in the space 52 which may be 1 p. s. i. at 600 R. P. M. (of the part 1)
    4 p. s. i. at 1200 R. P. M. (of the part 1)
   16 p. s. i. at 2400 R. P. M. (of the part 1)
   36 p. s. i. at 3600 R. P. M. (of the part 1)

Any fixed increase of pressure can be added by the provision of the spring 55, and if this is assumed at 5 p. s. i. there will be 6 p. s. i. at 600 R. P. M.
    9 p. s. i. at 1200 R. P. M.
   21 p. s. i. at 2400 R. P. M.
   41 p. s. i. at 3600 R. P. M.

The exposed area of each distributor valve may be 1 sq. in. The strength of the springs 62, 63 may be assumed 5 lb. This will offset the effect of the additional pressure due to the spring 55. In an assumed throttle position the spring 68 may maintain a pressure in the space 64 of 2.5 p. s. i. which produces a downward force of 2.5 lb. on each piston. The pistons 83, 84, may be of such area as to produce a force on the detents of 1.5 lb.

At 600 R. P. M. the downward force is
                                  2½+5=7½ lb.
  Upward force is_____6 lb.
  Force to overcome detent is_____1½ lb.
                                 6+1½=7½ lb.

and the distributor piston if outwards will snap in.

At 1200 R. P. M. the downward force is
                                  2½+5=7½ lb.
  Upward force is_____9 lb.
  Force to overcome detent_____1½ lb.
                              9 minus 1½=7½ lb.

and the piston if inwards will snap out.

The change from 1st to 2nd will therefore take place at 1200 R. P. M. and that from 2nd to 1st at 600 R. P. M.

If the pedal is moved downwards the spring on the piston 66 will be further compressed and it may, for example then retain 10 lb. sq. in. and hence will apply 10 lb. force on the distributor pistons and 6 lb. on the detents.

This will alter the speeds of change to 1200 R. P. M. and 2400 R. P. M. i. e.,

At 1200 R. P. M. downward force is___10+5=15 lb.
  Upward force is_____ 9 lb.
  Force to overcome detent is_____ 6 lb.
                                  9+6=15 lb.

and the piston will snap in.

At 2400 R. P. M. downward force is_____ 15 lb.
  Upward force is_____ 21 lb.
  Force to overcome detent is_____ 6 lb.
                                21 minus 6=15 lb.

and the piston will snap out.

In a similar manner the pedal will compress the spring 68 sufficiently to provide maximum performance e. g., if sufficient to maintain 40 lb. sq. in. changes would occur at 2400 and 4800 R. P. M.

The difference in R. P. M. for "up" change and "down" change is made somewhat greater than the change in R. P. M. caused by the change, so that there is no tendency to make more than one change at the same time. The speeds for changing one ratio may be somewhat different from those for another ratio, e. g., 1st to 2nd may change at 1200 R. P. M. at one pedal setting, whilst 2nd to 3rd may require say 1600 R. P. M. for the change at the same setting. Individual variation of the springs of the distributor pistons will vary this but will also vary the speed difference between "up" and "down" change. Variations of the areas of the pistons alters the R. P. M. for change but need not vary the speed difference.

The pedal can be arranged with whatever relationship between throttle and spring 68 that is desired, e. g. movement between shut and open throttle may vary the spring only slightly whilst additional pedal travel may vary it greatly.

It will be clear that the operator may obtain maximum possible R. P. M. in each ratio when desired by full movement of the pedal or minimum R. P. M. by a lesser movement. Speed of movement of the pedal may also influence the matter i. e., a quick movement can load spring 68 in advance of engine R. P. M. increase thereby producing a higher pressure at the outer ends of the distributor piston before a corresponding increase at the inner ends, thus forcing a "down" change or oppositely an "up" change by a quick movement, which would not result from a normal movement.

The arrangement provides almost unlimited choice of ratio within the range of engine R. P. M.

Another feature tending to give stability is the fluid displacement. If for example the second distributor piston snaps outwards, it tends to create a pressure rise by momentary displacement of the valve 66 owing to the restriction of the duct 65 and similarly a pressure fall on snapping inwards, hence even if the other pistons tended to move at the same R. P. M. the tendency is momentarily removed whilst the engine reaches the changed R. P. M.

It will be appreciated that when the vehicle comes to rest with the throttle shut, the pistons will move in one after the other thereby placing the unit ready for a first gear start.

It will be understood that any number of distributor valves such as 57, 58, may be employed with interlocking devices such as 87 and a suitable number will be provided to control the number of ratios obtained with the transmission. It will be understood also that a reverse may be obtained either by movement of some positive connection such as a dog-clutch which may be connected so as to be accomplished by movement of the lever 49 or by engagement of certain of the friction devices, in which case the valve 47, when moved to the position for reverse, may open the pressure in the space 45 to ducts leading to the appropriate friction device. These ducts may be interrupted by a valve or valves such as 94 whereby at least one of the friction devices is automatically engaged and disengaged at some predetermined speed of the part 1.

It will be appreciated that a number of piston valves may be carried in the part 1 which control separate hydraulic circuits or other pressure varying devices may be introduced into the circuits comprising ducts such as 59, 60, 61, so as to provide suitable pressures for operation of any of the friction devices under any condition of operation. The valve 50 serves as such a device in so far that it maintains some minimum given pressure in the duct 71. The pressure in the duct 48 may be arranged to be varied with speed of the pumps 42 and 40.

I claim:

1. In a variable speed transmission mechanism having an input shaft, a rotary input part connected to the input shaft, an output shaft, gearing elements connected between the rotary part and the output shaft, at least two friction clutch devices having input and output elements, the input elements being carried by the input shaft and the output elements being carried by different elements of the said gearing, at least one friction brake device adapted to have braking engagement with an element of the gearing to provide a required transmission ratio, and fluid-pressure actuated means for rendering said devices effective, the provision of an automatic control apparatus comprising a liquid pressure chamber, means for supplying fluid from the pressure chamber to the means for rendering the friction devices effective, pump means driven by the input shaft and adapted to feed fluid to said chamber, a valve chamber in said rotary part connected to said pressure chamber and having an exhaust opening, a valve member in said valve chamber controlling outlet of fluid through said exhaust opening and thereby controlling the degree of pressure in said pressure chamber, said valve member being urged under centrifugal action to close the exhaust and urged under said fluid pressure to open the exhaust, a non-rotary part, at least one distribution valve in said non-rotary part including at least one movable valve element interposed between the outlet of said pump on the one hand and the clutch and brake friction devices on the other hand, and movable into different positions in which fluid is applied to the appropriate devices to produce the required transmission ratios said movable valve element being urged by the pressure in the pressure chamber in that direction of movement of the element which will vary the fluid distribution to the clutch and brake friction devices, and detent means for locating the distributor valve element in different positions corresponding to different transmission ratios.

2. A control apparatus as claimed in claim 1 having a cylinder constituting the valve chamber carried by the rotary part, a piston constituting said valve member and located in said cylinder, the outer end of the piston being exposed to the fluid pressure which tends to urge the piston inwards to uncover the exhaust opening.

3. A control apparatus as claimed in claim 1 having a cylinder constituting the valve chamber carried by the rotary part, a piston constituting said valve member and located in said cylinder, the outer end of the piston being exposed to the fluid pressure which tends to urge the piston inwards to uncover the exhaust opening, and a spring is provided which urges the piston outwards in addition to centrifugal force.

4. A control apparatus as claimed in claim 1 having a cylinder bore, the distributor valve element being a piston operating in said cylinder bore.

5. A control apparatus as claimed in claim 1 wherein openings are provided in the distributor valve element, and the detent means comprise a solid movable element carried in the said non-rotary part and entering said openings, a piston carried in the said non-rotary part, one end of said piston being open to liquid pressure, said solid element being urged in the direction to engage said distributor valve element by said piston.

6. A control apparatus as claimed in claim 1 wherein openings are provided in the distributor valve element, and the detent means comprise a solid movable element carried in the said non-rotary part and entering said openings, a spring carried in said non-rotary part, said solid element being urged in the direction to engage said distributor valve element by said spring.

7. A control apparatus as claimed in claim 1 wherein at least two distributor valve elements are arranged side by side, openings are provided in said elements, and the fixed part also carries a solid detent element which interlocks the valve elements by means of said openings therein, said detent element engaging at its ends in said openings, the length of the detent element being such that when one end engages in one of said openings in one said valve element the other end no longer maintains detent engagement in the other said valve element.

8. A control apparatus as claimed in claim 1 wherein the distributor valve element is urged in the other direction by variable liquid pressure controlled by the operator.

9. A control apparatus as claimed in claim 1 wherein said distribution valve element is urged in the other direction by a spring.

10. A control apparatus as claimed in claim 1 wherein the distributor valve is urged in the other direction by both a spring and variable liquid pressure controlled by the operator.

11. A control apparatus as claimed in claim 1 wherein the distributor valve element is urged in the other direction by variable liquid pressure controlled by the operator and wherein the liquid pressure controlled by the operator also acts on the detent means.

12. A control apparatus as claimed in claim 1 having means whereby the distributor valve element is urged in the other direction by variable liquid pressure controlled by the operator, said means including a duct of restricted area leading to a pressure space, an exhaust duct in said non-rotary part, a piston urged by the liquid pressure in the pressure space in a direction to open said exhaust, and a spring urging said piston in the direction to close the exhaust.

13. A control apparatus as claimed in claim 1 having means whereby the distributor valve element is urged in the other direction by variable liquid pressure controlled by the operator, said means including a duct of restricted area leading to a pressure space, an exhaust duct in said non-rotary part, a piston urged by the liquid pressure in the pressure space in a direction to open said exhaust, a spring urging said piston in the direction to close the exhaust, and means whereby force exerted by the spring is controllable by the operator.

14. A control apparatus as claimed in claim 1 having means whereby the distributor valve element is urged in the other direction by variable liquid pressure controlled by the operator, said means including a duct of restricted area leading to a pressure space, an exhaust duct in said non-rotary part, a piston urged by the liquid pressure in the pressure space in a direction to open said exhaust, a spring urging said piston in the direction to close the exhaust, and means which connect the spring to an engine speed controlling device and arranged so that when it is moved for increased speed the force from the spring is increased.

15. A control apparatus as claimed in claim 1 having means whereby the distributor valve element is urged in the other direction by variable liquid pressure controlled by the operator, said means including a duct of restricted area leading to a pressure space, an exhaust duct in said non-rotary part, a piston urged by the liquid pressure in the pressure space in a direction to open said exhaust, a spring urging said piston in the direction to close the exhaust, and means connecting the spring to an engine speed controlling device and arranged so that the force from the spring is increased if the controlling device is moved beyond the position giving full speed.

16. A control apparatus as claimed in claim 1 wherein the distributor valve element is urged in the other direction by pressure applying means and a manual control is provided which can be set to vary the pressure exerted by said pressure applying means.

17. A control apparatus as claimed in claim 1 wherein the distributor valve element is urged in the other direction by pressure applying means and a manual control is provided which can be set to vary the pressure exerted by said pressure applying means and wherein the said manual control can be set so as to maintain a minimum fixed force from the said pressure applying means.

18. A control apparatus as claimed in claim 1 having pressure applying means for urging the distributor valve element in the other direction, a manual control which can be set to vary the pressure exerted by said pressure applying means, and means whereby the force acting to engage the detent means can be set by said manual control.

19. A control apparatus as claimed in claim 1 having pressure applying means for urging the distributor valve element in the other direction, a manual control which can be set to vary the pressure exerted by said pressure applying means, means whereby setting of the manual control maintains a minimum fixed force from the said pressure applying means and sets the force acting on the detent means to some minimum.

20. A control apparatus as claimed in claim 1 wherein an additional relief valve is provided in communication with the pump outlet so as to maintain at such point a given minimum pressure which can be opened to the friction devices.

HOWARD FREDERICK HOBBS.

REFERENCES CITED

The following references are of record in the file of this patent:

UNITED STATES PATENTS

| Number | Name | Date |
|---|---|---|
| 2,177,904 | Maybach | Oct. 31, 1939 |
| 2,328,092 | Nutt et al. | Aug. 31, 1943 |
| 2,332,593 | Nutt et al. | Oct. 26, 1943 |
| 2,374,303 | Osborne | Apr. 24, 1945 |
| 2,440,589 | Kegresse | Apr. 27, 1948 |

FOREIGN PATENTS

| Number | Country | Date |
|---|---|---|
| 813,616 | France | Mar. 1, 1937 |